(12) United States Patent
Assadi et al.

(10) Patent No.: US 12,709,476 B1
(45) Date of Patent: Aug. 18, 2026

(54) ELECTROMAGNET SWITCH FOR SHUTTLES ON A TRACK

(71) Applicant: Amazon Technologies, Inc., Seattle, WA (US)

(72) Inventors: Michael D Assadi, Seattle, WA (US); Zechariah Ives, Auburn, WA (US); Sudhakar Teegavarapu, Hopkinton, MA (US); Jeffrey Nelson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 656 days.

(21) Appl. No.: 18/312,190

(22) Filed: May 4, 2023

(51) Int. Cl.
*B65G 1/06* (2006.01)
*B65G 54/02* (2006.01)

(52) U.S. Cl.
CPC ............... *B65G 1/06* (2013.01); *B65G 54/02* (2013.01)

(58) Field of Classification Search
CPC ...... B65G 54/02; B65G 1/1373; B65G 47/46; B65G 47/53; B65G 35/06; B65G 2812/02069; B65G 2812/02079; B65G 2203/043; B61B 13/00; B61B 13/12; B61B 5/02; B60L 13/03; B60L 13/003; B60L 13/06; B60L 13/10; B60L 13/08; B60L 15/005; B60L 2200/26; H02K 41/00; H02K 41/02; H02K 41/031; E01B 25/34
USPC ......... 198/370.13, 619, 381; 104/88.01, 281, 104/130.02, 130.06, 130.07, 282, 290, 104/292
See application file for complete search history.

(56) References Cited

U.S. PATENT DOCUMENTS 5,720,377 A * 2/1998 Lapeus .................. G01N 35/04 198/465.1
12,103,402 B2 * 10/2024 Huang .................. B60L 15/005

* cited by examiner

*Primary Examiner* — S. Joseph Morano
*Assistant Examiner* — Heaven R Buffington
(74) *Attorney, Agent, or Firm* — Eversheds Sutherland (US) LLP

(57) ABSTRACT

Systems and methods are disclosed for a track system for transporting a shuttle with a payload from one location to another location in a fulfillment center. A track system may include linear synchronous motors (LSMs) to propel the shuttle along a desired path of the track system. The track system may include multiple track paths, magnet assemblies, and electromagnets for diverting shuttles to alternative paths. To cause a shuttle to move from one track path to another track path, an electromagnet and a magnet assembly may be positioned at an intersection between the paths. When the electromagnet is energized the magnetic field of the electromagnet may attract the shuttle to a desired path (e.g., curved path) and the magnet assembly may cause to shuttle travel along the desired path.

15 Claims, 10 Drawing Sheets

ELECTROMAGNET SWITCH FOR SHUTTLES ON A TRACK

BACKGROUND

As users increasingly make online purchases, fulfillment of such purchases and other orders may become increasingly complicated. For example, a fulfillment center may have output of upwards of one million packages per day. With such demands, efficiency of logistics related to processing orders and packages may be important. For example, use of equipment to move or otherwise handle objects may improve efficiency. Fixed package transport and sorting systems without the ability to quickly change paths and divert to various destinations about the fulfillment center may create chokepoints or cause bottlenecks in fulfillment center operations. Accordingly, improvements in various operations and components of order fulfillment, such as improvements to sorting and transport technology and so forth may be desired.

BRIEF DESCRIPTION OF THE DRAWINGS

FIG. 8 is a schematic illustration of a set of magnets with alternating polarity and backing structure in accordance with one or more embodiments of the disclosure.

Figure 1:
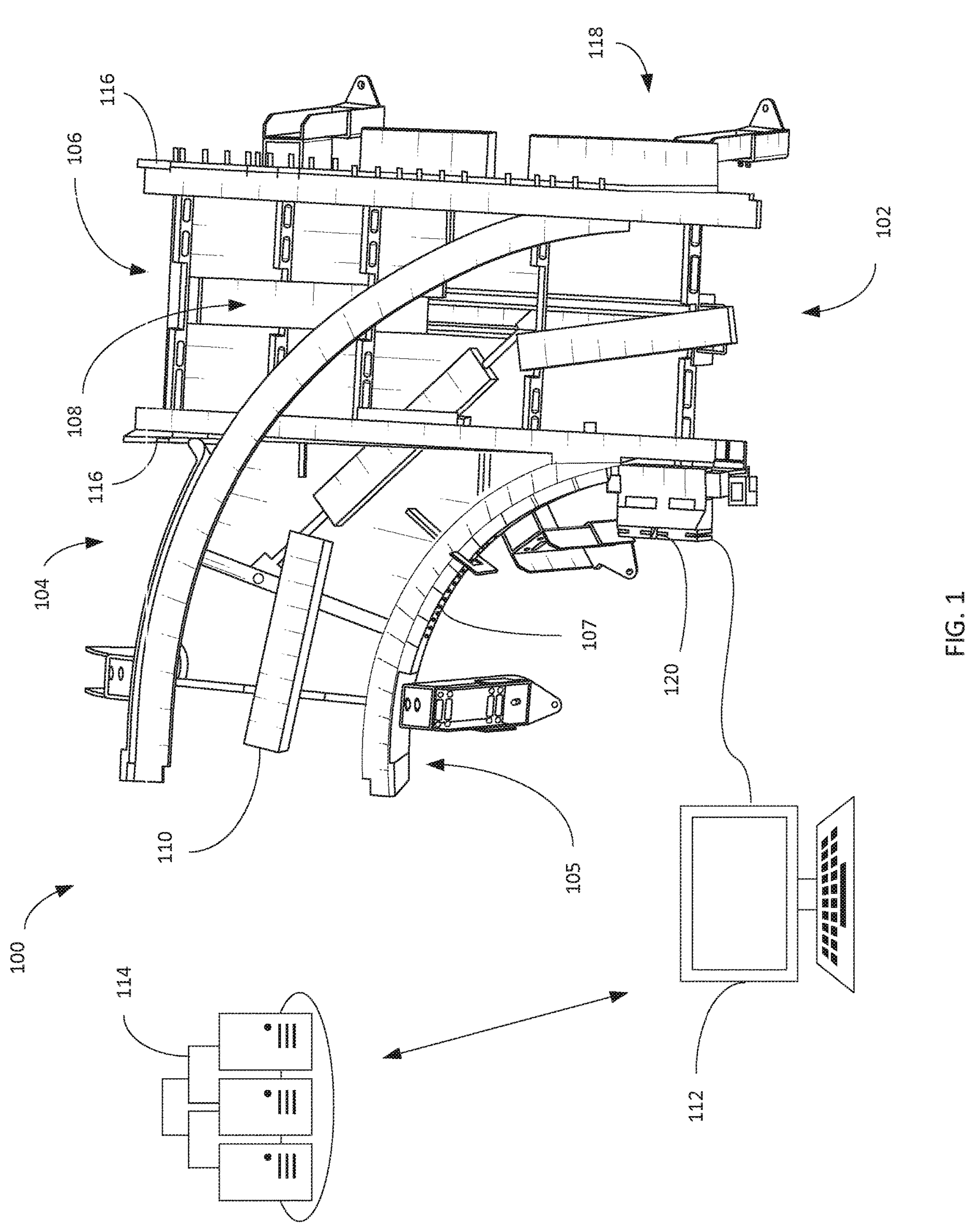
FIG. 1 is a schematic illustration of a shuttle rail system with an electromagnetic switch and a magnetic array in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Fulfillment centers may be used to fulfill online purchases and other orders. For example, fulfillment centers may include product inventory that may be pulled when an order for a particular product or multiple products is placed. In some instances, the product(s) may be packed and shipped from the fulfillment center. However, the process of obtaining the product(s), packing the product(s), and shipping the product(s) may be complicated due to the amount of inventory, the number of orders to process, the size of the fulfillment center, and/or other factors. In addition, a portion of the fulfillment center designated for packing or shipping may be different than the portion of the fulfillment center designated for holding product inventory. As a result, transportation of products in an order may be time consuming. It is understood that a fulfillment center may alternatively be a sorting center and/or a shipping/delivery center.

In a typical warehouse environment, items may be transported through various means such as conveyors, belts, shuttles, etc. as they are transport from one location to another. For instance, transporting items from a pick station to a sort station may involve the item(s) being picked into a container, such as a tote, which may then be transported via a shuttle. Shuttles may move along tracks that have intersections allowing the shuttle to change directions, such as to make left hand turns, right hand turns, go forward along a linear path, etc. For example, the shuttles and/or tracks may be the same or similar to those disclosed in U.S. patent application Ser. No. 17/937,003, the entire contents of which is hereby incorporated by reference.

The set of rails may form the track. The rails may include rail segments on either side for supporting a shuttle. Along a central axis of the rails linear synchronous motors (LSMs) may be positioned. The shuttle may include wheels for traversing the rails and may also include a ferrous block or portion (e.g., a magnet having iron, nickel and/or cobalt) that may be attracted to or otherwise propelled by the LSMs to propel the shuttle down the track.

A track system may selectively activate LSMs to propel the shuttle along a desired path of the track system. The track system may include an multiple track paths. For example the track may include a linear path that branches off into other paths, such as a curved path. The track system may further include magnet assemblies and electromagnets for diverting shuttles to alternative paths.

To cause a shuttle to move from one track path to another track path, an electromagnet and a magnet assembly may be positioned at an intersection between the paths. For example, a curved path may intersect with a linear path. The curved path may include a wall structure along the curved path and a magnet assembly that includes a set of focused magnets each having a housing, a set of magnets having alternating polarity, and a backing structure, such as stacked plates (e.g., stainless steel plates).

An electromagnet may be positioned adjacent to or near the magnet assembly. When the electromagnet is energized the magnetic field of the electromagnet may attract the shuttle to the curved path and the magnet assembly may cause to shuttle to advance along the curved path, diverting the shuttle from the linear path. Alternatively, the electromagnet may be positioned along the linear path and may attract the shuttle to the linear path when energized and when not energized the magnet assembly may attract the shuttle to the curved path.

Referring to FIG. 1, an example track system is depicted in accordance with one or more embodiments of the disclosure. Track system 100 may be designed to transport shuttles having payloads (e.g., packages, items, totes, bags, etc.) from one location in a fulfillment center to another location in the fulfillment center. Track system 100 may include track 104 that is formed by multiple rail segments, controller 112 which may be in wired or wireless communication with the components of track system 100, and server 114 which may be in wireless or wired communication with controller 112 and/or other components of track 104.

Controller 112 may be any type of computing device having a processor and optionally a display (e.g., laptop, desktop, tablet, smartphone, server, etc.). Controller 112 may facilitate communication to, from, and/or between components of track 104 and/or a shuttle on track 104 via any well-known wired or wireless system (e.g., Bluetooth, Bluetooth Low Energy (BLE), near field communication protocol, Wi-Fi, cellular network, etc.). Controller 112 may process information and/or perform operations and tasks described herein alone or together with server 108.

Server 114 may be one or more servers, computers, desktop computers, laptop computers, datastores, and/or any other electronic or computing device. Server 114 may communicate with controller 114 and/or other components of track 104 and/or a shuttle on track 104 via any well-known wired or wireless system (e.g., Bluetooth, Bluetooth Low Energy (BLE), near field communication protocol, Wi-Fi, cellular network, etc.). Server 114 may oversee operation of the fulfillment center and controller 112 and/or server 114, together or alone, and may oversee function and operation of track 104 and optionally any shuttles on track 104.

Track 104 may include rail segments (e.g., rail segments 116). For example rail segments may form linear path 106 and/or curved path 105. Curved path 105 may branch off of linear path at intersection 118. A center axis may extend between rail segments 116 for both curved path 105 and linear path 106. Linear Synchronous Motors (LSMs) 102, 108, 110 may be positioned along the center axis of the track 104, such as along linear path 116 and along the center axis of curved path 105. LSMs 108 and/or 110 may be any suitable LSMs for selectively propelling a shuttle down the track.

LSMs 110 and/or 108 may be selectively activated or energized by controller 112 to cause a shuttle with a ferrous portion (e.g., block) of the shuttle to be magnetically propelled to advance along track 104. In this manner, a shuttle may be advanced from one location to another on track 104. Each LSM may be positioned below or incorporated into a floor of track 104.

As shown in FIG. 1, curved path may include magnetic assembly 107 which may include a series of permanent magnets positioned along a rail segment of one side of curved path 105. Curved path 105 may further include electromagnet 120 positioned adjacent to or near magnet assembly 107 which may serve as a switch to cause a shuttle to be diverted or redirected to a different path. Electromagnet 120 may be oriented at a 90 degree angle with respect to LSMs positioned along the center axis of tack 104. Electromagnet 120 may be designed to attract a ferrous portion (e.g., block) on a side of the shuttle, whereas LSMs 110 and/or 108 may be designed to propel the shuttle along the track.

Track 104 may have a determinative path (e.g., linear path 106) such that a shuttle will be biased (e.g., due to LSMs 108) to traverse linear path 106 and not curved path 105. Electromagnet 120 may be energized to cause the shuttle to enter curved path 105. Electromagnet 120 may, when energized, have a magnetic force stronger than that along the linear path.

Magnetic assembly 107 may provide a consistent magnetic force along curved path 105 to cause the shuttle to continue to traverse curved path 105 even after the shuttle passes electromagnet 120 along the direction of travel. It is understood that electromagnet 120 may precede the magnetic assembly along the direction of travel of the shuttle.

Controller 112 may determine that a payload on the shuttle should be directed to a location along curved path 105. Controller may cause electromagnet 120 to activate when the shuttle is near or at intersection 118, which may cause the shuttle to divert from the determinative path (e.g., linear path 106) and enter curved path 105. In this manner the controller and/or server may cause a shuttle to be diverted from a determinative path to linear path 110.

Figure 2:
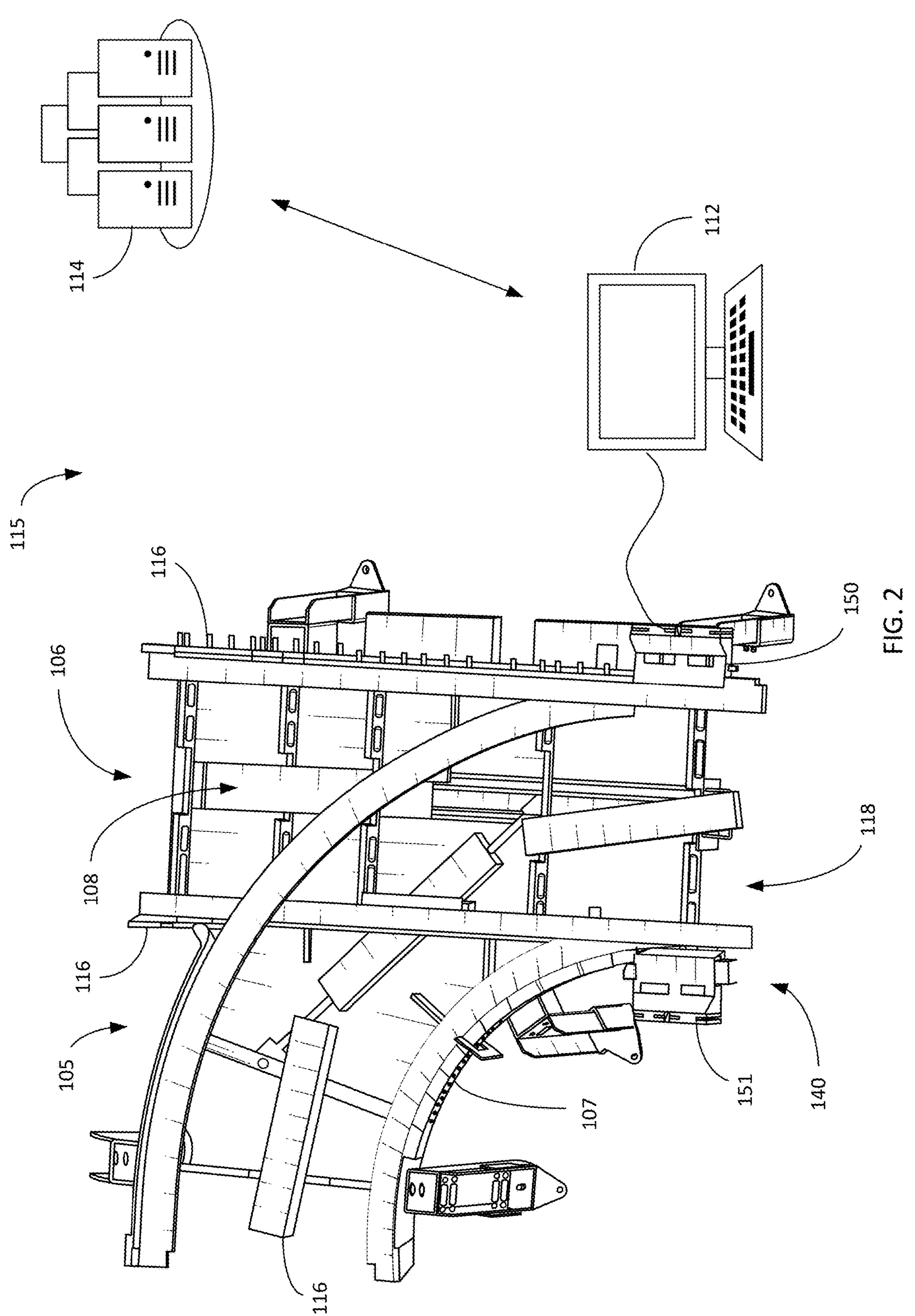
FIG. 2 is a schematic illustration of a shuttle rail system with an electromagnetic switch including two electromagnets and a magnetic assembly in accordance with one or more embodiments of the disclosure.

Referring now to FIG. 2, track system 115 is illustrated, which may be similar to track system 100 and may include track 140 which may be similar to track 104. Track system 115 may further include controller and server 114. For example, track 140 may include a track including rail segments 116 that form linear path 106 and curved path 105. Curved path 105 may include LSMs 110 and linear path 106 may include LSMs 108. Curved path 107 may also include magnetic assembly 107.

Magnetic assembly 107 and/or LSMs 110 may be designed to overcome LSMs 108 or other magnets (e.g., permanent magnets) of linear path 106 such that curved path 105 is the determinative path. The shuttle may be biased to thus traverse curved path 105 as it advances along the LSMs (e.g., LSMs 110). Electromagnet 150 may be positioned at intersection 118 along linear path 106 and electromagnet 151 may be positioned at intersection 115 along curved path 105. Electromagnet 150 and/or electromagnet 151 may be energized (e.g., by controller 112) to cause the shuttle to divert from the determinative path (e.g., curve path 105) and instead traverse linear path 116. Electromagnet 150 and/or electromagnet 151 may serve as a switch to cause a shuttle to be diverted or redirected to a different path. Intersection 118 may be a switch area.

Electromagnet 150 and/or electromagnetic 151 may be the same or similar to electromagnet 120 of FIG. 1. It is understood that electromagnet 150 may be designed to generate a magnetic force large enough to attract a ferrous portion (e.g., block) on a side of shuttle 108 which is strong enough to overcome a magnetic attraction generated by magnetic assembly 107 and/or LSMs 110. Electromagnet 151 may have an electrical field that when energized opposes, cancels and/or lessens the magnetic attraction or force of magnetic assembly 107 thereby offsetting the magnetic attraction or force of magnetic assembly 107. When electromagnet 150 and/or electromagnet 151 is not energized, the shuttle may thus be attracted to magnetic assembly 107 and/or electromagnets 110 and may traverse curved path 105. When electromagnet 150 and electromagnet 151 are energized, electromagnet 151 may oppose, cancel and/or lessen the magnetic attraction caused by magnetic assembly 107 and electromagnet 150 may magnetically attract a ferrous portion of the shuttle, causing the shuttle to travel down linear path 106.

Illustrative Embodiments and Use Cases

Figure 3:
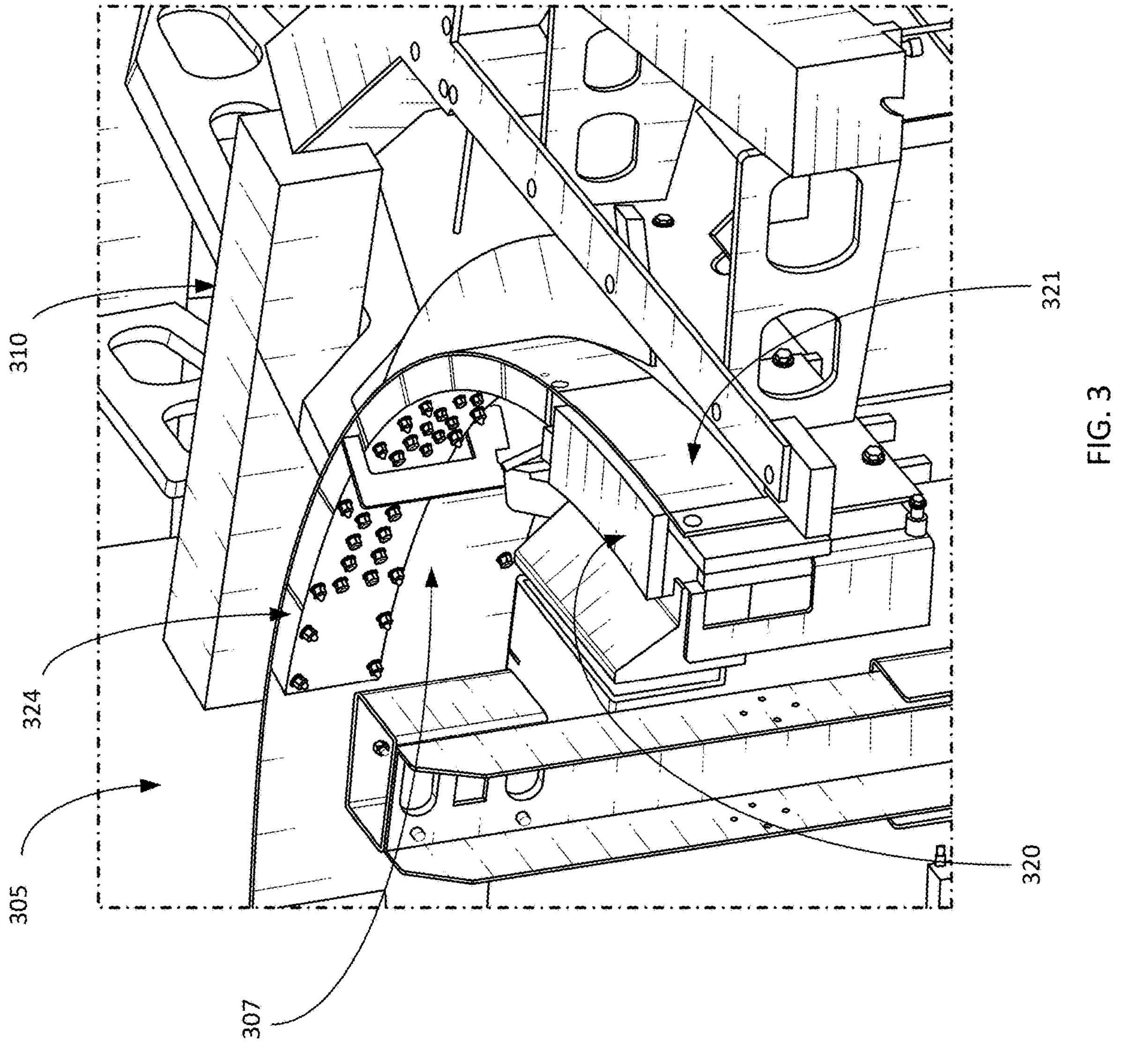
FIG. 3 is a schematic illustration of a magnetic assembly along a curved track in accordance with one or more embodiments of the disclosure.

Referring now to FIG. 3, curved path 305 is illustrated, which may be similar to curved path 105 of FIG. 1. For example, curved path 305 may be part of a track, such as track 104 of FIG. 1. Curved path may include multiple LSMs (e.g., LSMs 310) which may be the same as or similar to LSMs 110 of FIG. 1. Curved path 305 may further include electromagnet 320 and magnet assembly 307.

Electromagnet 320 may be the same as or similar to electromagnet 120 of FIG. 1 and may be positioned behind a wall structure, which may be a flat vertical structure that is curved along a rail segment of curved path 305. For example, wall structure 321 may be made from a metal (e.g., stainless steel), plastic, and/or any other suitable material. Electromagnet 320 may be selectively energized and may generate a magnetic field when generated.

Magnetic assembly 107 may be positioned behind wall structure 321. As shown in FIG. 3, magnetic assembly 107 may include a series of focused magnets 324 positioned behind wall structure 321. Focused magnets 324 may include permanent magnets (e.g., ferrous material such as nickel, cobalt and/or iron) and may have a magnetic field. Focused magnets 324 may be secured to wall structure 321 via one a bolted or threaded engagement (e.g., bolts, nuts, screws, etc.).

Figure 4:
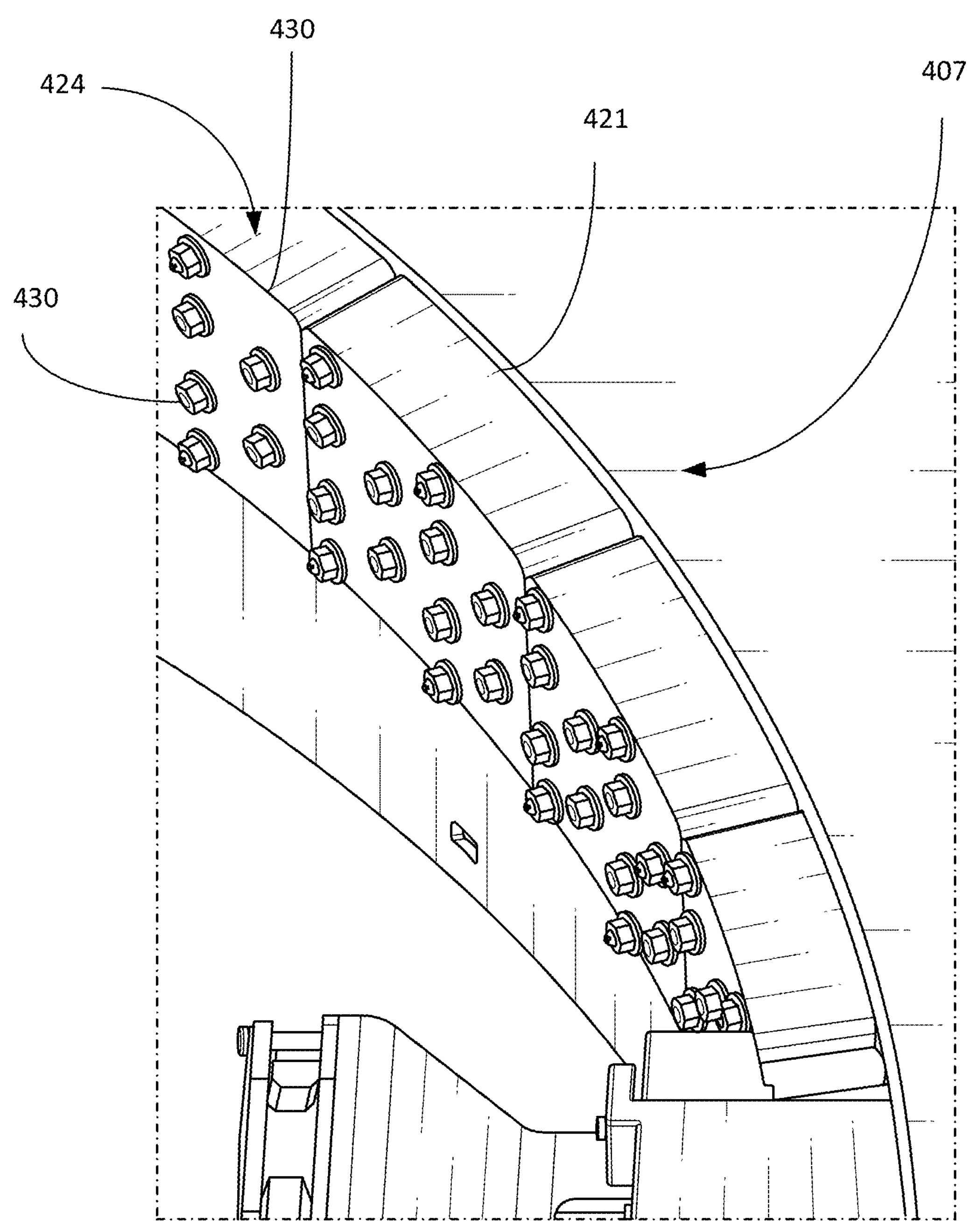
FIG. 4 is a schematic illustration of a curved magnetic assembly in accordance with one or more example embodiments of the disclosure.

Referring now to FIG. 4, magnetic assembly 407 is illustrated, which may be the same or similar as magnetic assembly 107 of FIG. 1. Magnetic assembly 407 may include multiple focused magnets 424 positioned along wall structure 421. Focused magnets 424 may each include a housing secured to wall structure 421 via threaded engagement 430, which may include a bolt and/or a nut.

Figure 5:
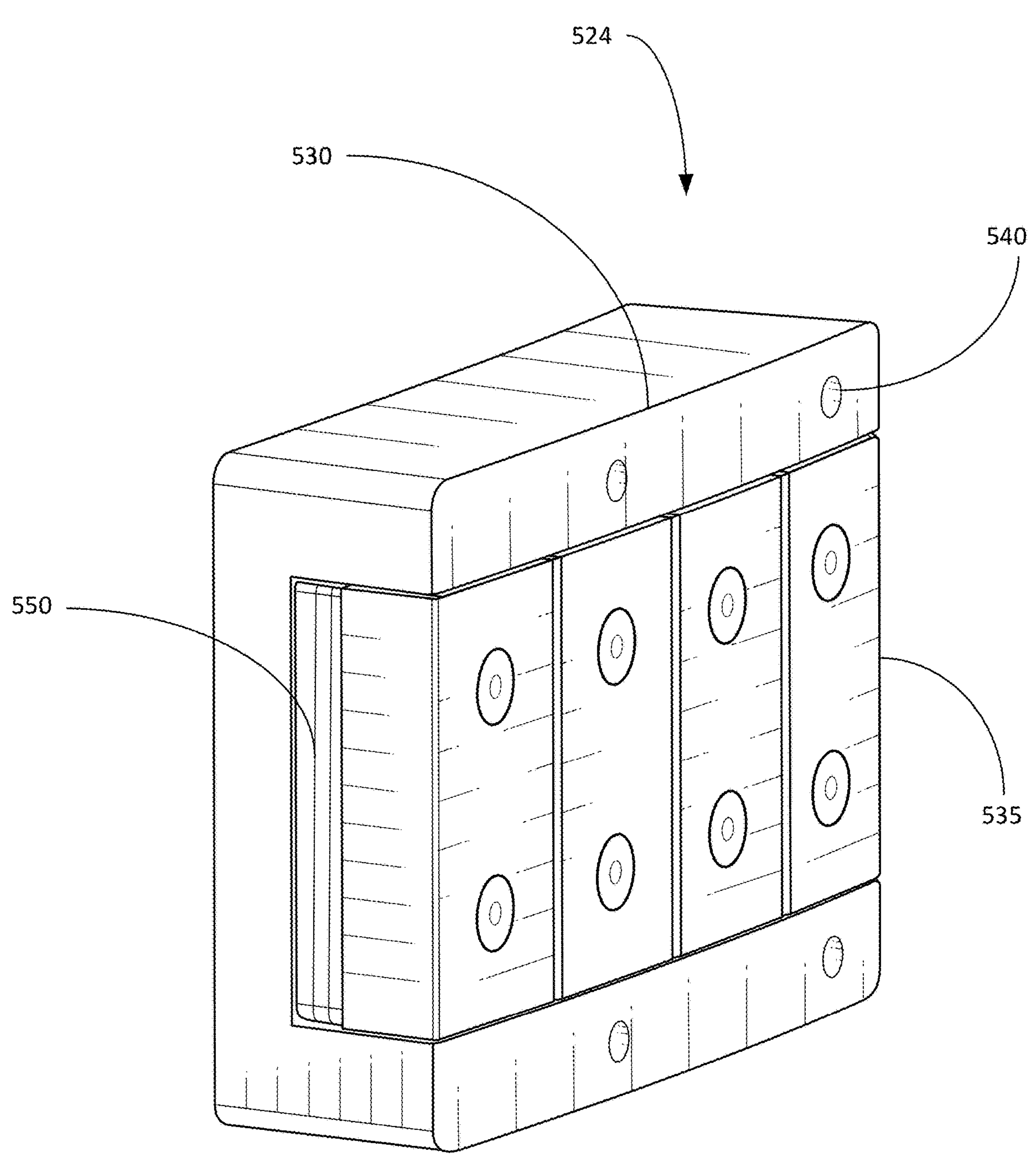
FIG. 5 is a perspective illustration of a focused magnet in accordance with one or more embodiments of the disclosure.

Referring now to FIG. 5, a perspective view of focused magnet 524 is illustrated. Focused magnet 524 may be one of a set of focused magnets along a magnetic assembly positioned on a curved path (e.g., magnetic assembly 107 and curved path 105 of FIG. 1). Focused magnet 524 may include magnets 535, which may be multiple rectangular or other shaped magnets arranged in series with alternating north and south polarity. Focused magnet 524 may further include backing structure 550, which may be made from multiple stacked plates (e.g., stainless steel plates).

Magnetic assembly 107 may further include housing 530, which may support magnets 535 and/or backing structure 550. Housing 530 may be made from any rigid material such as glass reinforced nylon, metal and/or plastic. Housing 530 may have a recessed portion for receiving magnets 535 and backing material 550. Housing 530 may further include through holes 540 for securing backing structure 550 and/or magnets 530 to housing 530 and/or securing housing 530 to a wall structure (e.g., wall structure 321 of FIG. 3). Housing 530, backing structure 550 and/or magnets 535 may be curved. Magnets 535 may be any ferrous material (e.g., iron, cobalt, and/or nickel) and backing structure 550 may be any metal (e.g., stainless steel).

Figure 6:
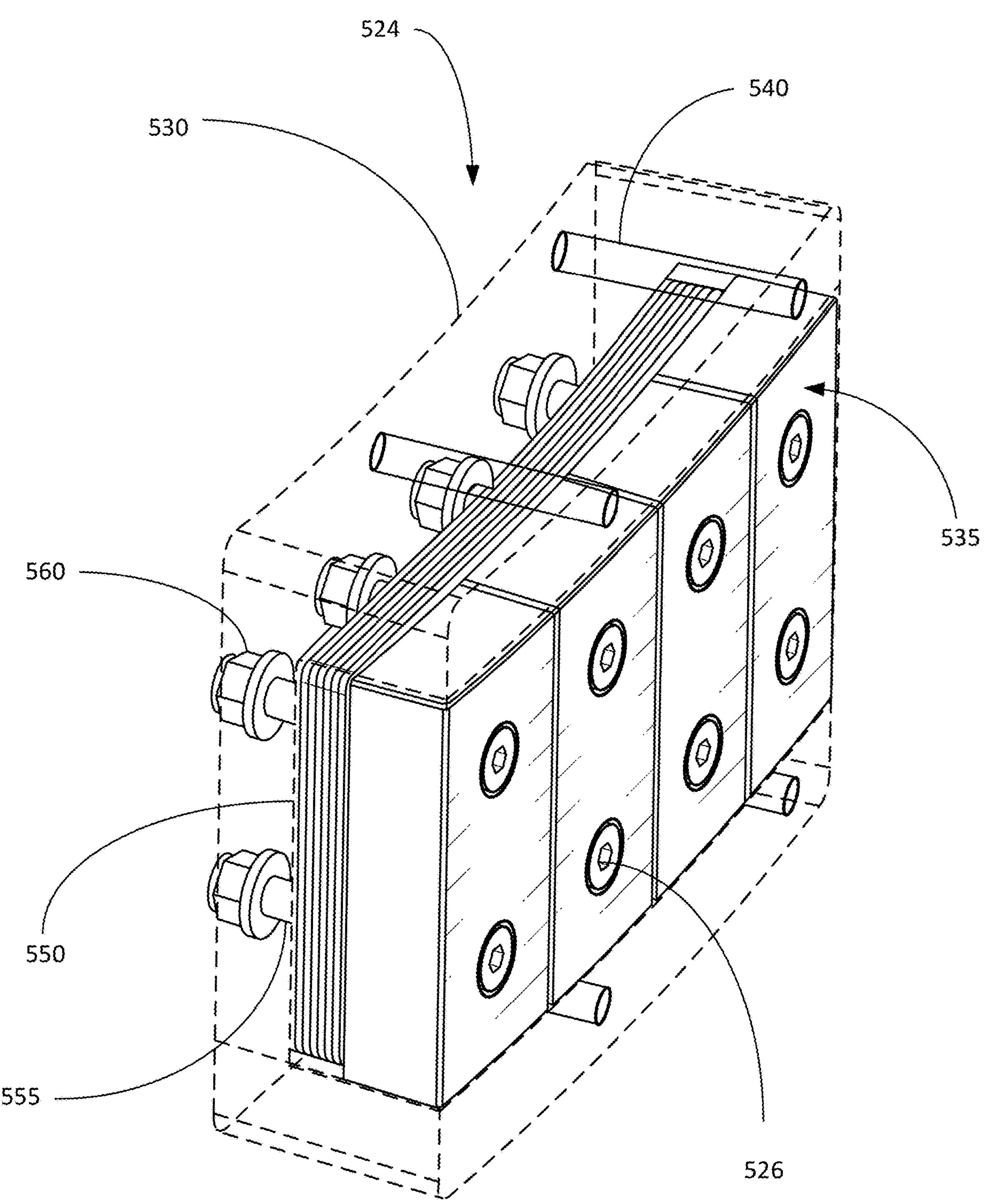
FIG. 6 is a perspective illustration of internal components of a focused magnet in accordance with one or more embodiments of the disclosure.

Referring now to FIG. 6, a wire-frame version illustration of housing 530 of focused magnet 524 is illustrated. As shown in FIG. 6, bolts 555 (e.g., with heads 526, etc.) may extend through holes 540 of housing 530 to secure magnets 535 and backing structure 550 to housing 530 (e.g., using bolt 555 and nut 560). Further though holes 540 may be used to secure housing 530 to a wall structure. While backing structure 555 may be multiple stacked plates, it may alternatively be a solid block or portion.

Figure 7:
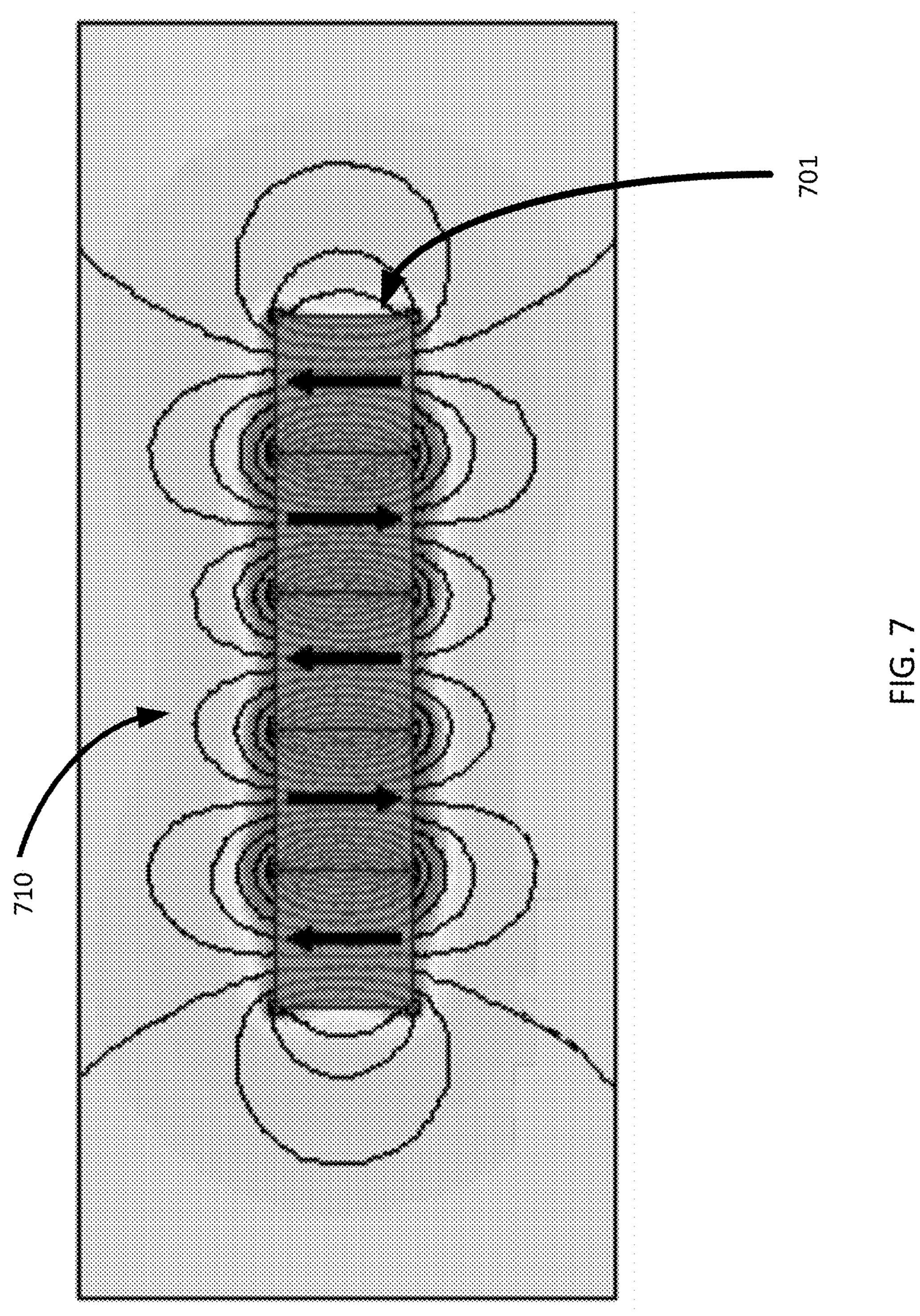
FIG. 7 is a schematic illustration of a set of magnets with alternating polarity in accordance with one or more embodiments of the disclosure.

Referring now to FIG. 7, alternating magnets arranged in series and a corresponding magnetic field are illustrated. Magnets 701 may be the same as or similar to magnets 535 of FIG. 5. For example magnets 701 may be arranged in series and may alternate in polarity (e.g., each magnet may be rotated 180 degrees). The alternating arrangement may increase the magnetic attraction and/or the magnetic force of magnetic field 710 by three times as compared to magnets arranged in series but oriented in the same direction (e.g., not alternating). Alternatively, the magnets may be arranged into a halfback array (e.g., each magnet may be rotated 90 degrees).

Figure 8:
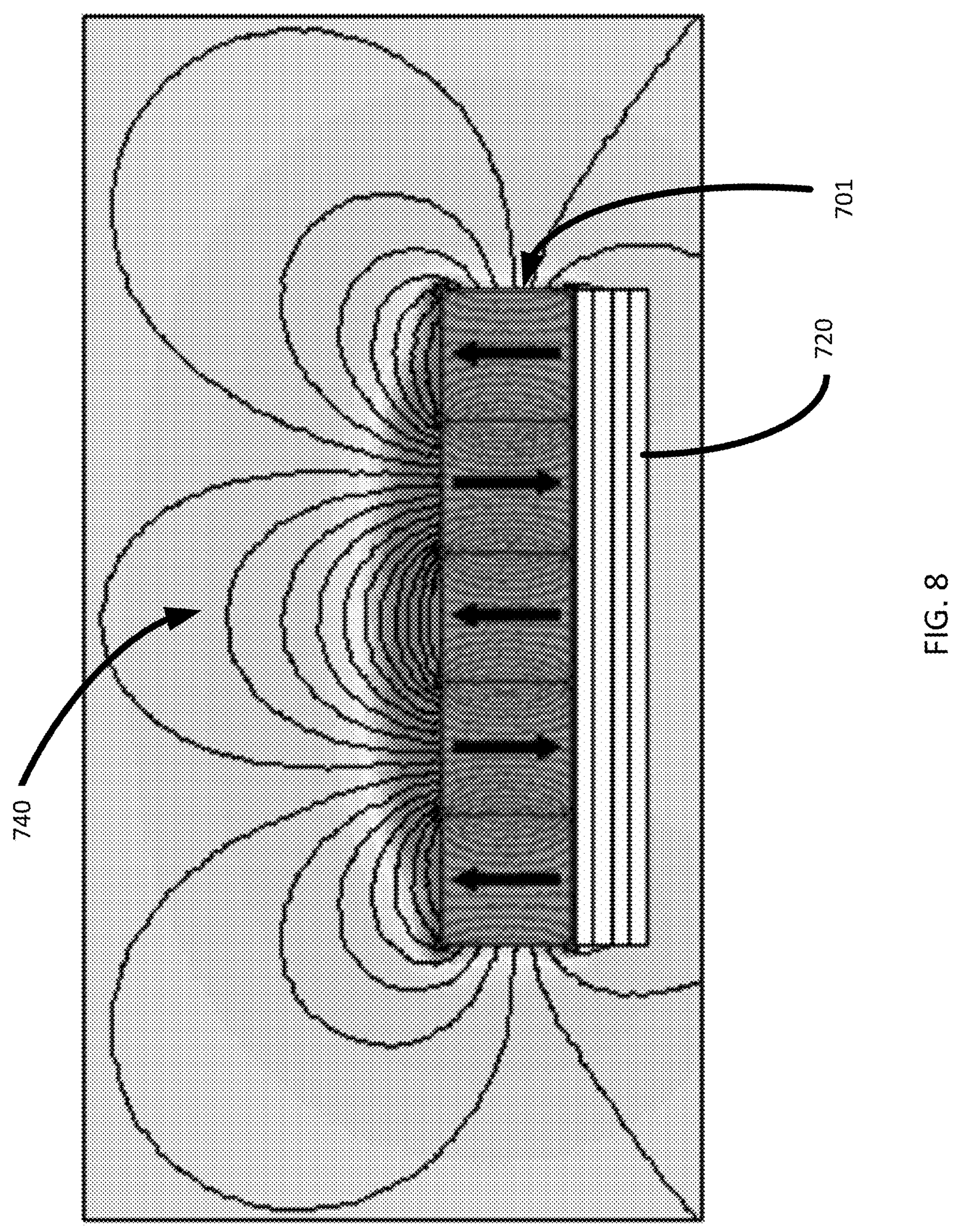
FIG. 8 is a schematic illustration of a set of magnets with alternating polarity in accordance with one or more embodiments of the disclosure.

Referring now to FIG. 8, alternating magnets arranged in series with a backing structure and a corresponding magnetic field are illustrated. Magnets 701 may be arranged in series and may alternate in polarity (e.g., each magnet may be rotated 180 degrees or 90 degrees). Backing structure 720 may be positioned behind magnets 701. While a 180 degree rotation is illustrated in FIG. 8, it is understood that magnets may rotate 90 degrees instead. Backing structure 720 may be the same as or similar to backing structure 550 of FIG. 5. As shown in FIG. 8, with backing structure 720 positioned behind magnets 701. Positioning backing structure 720 behind magnets 701 may increase the magnetic attraction and/or the magnetic force of magnetic field 740 by four times as compared to magnets arranged in series but oriented in the same direction (e.g., not alternating) and without backing structure 720.

Figure 9:
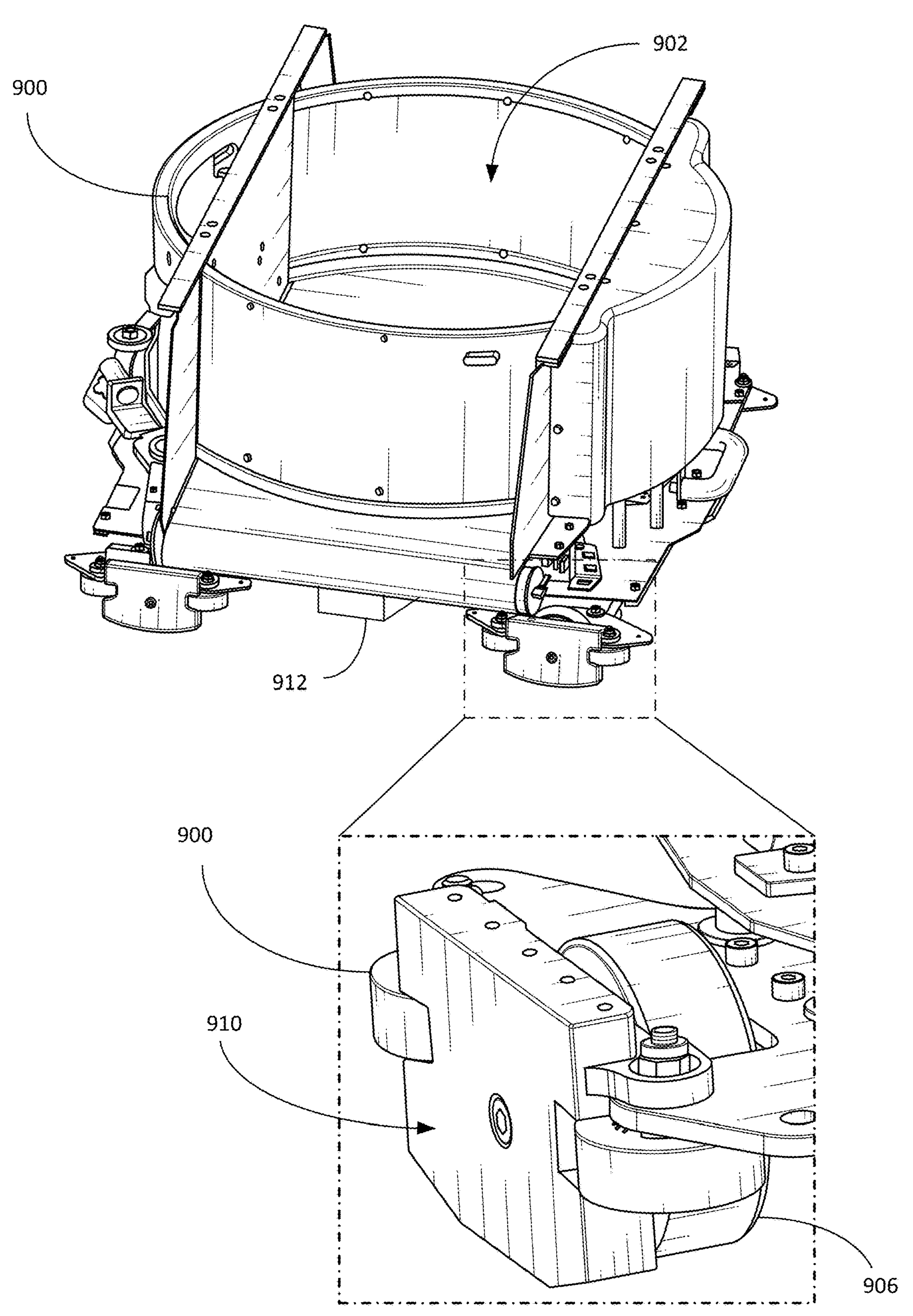
FIG. 9 is a schematic illustration of a shuttle in accordance with one or more embodiments of the disclosure.

Referring now to FIG. 9, a shuttle for traversing a track and carrying a payload is illustrated. Shuttle 900 may include payload compartment 902 for holding one or more payloads (e.g., items, packages, bags, totes, etc.). Shuttle 900 may also include wheels 906 for advancing along a track (e.g., track 104 of FIG. 1) as well as wheels 900 on either side of shuttle 900 for engaging a wall structure (e.g., wall structure 321 of FIG. 3).

Shuttle 900 may further include ferrous portion 910 and/or ferrous portion 912, which each may be a block or other ferrous shape or structure made from any ferrous and/or magnetic material (e.g., iron, cobalt and/or nickel) and/or magnets. Ferrous portion 910 may be positioned at a side of shuttle 900 such that ferrous portion 910 may be attracted to an electromagnet and/or magnet assembly along a wall of a rail segment. Ferrous portion 912 may be positioned near a bottom region of shuttle 900 such that it may electro-magnetically interact with LSMs positioned along a center axis and/or beneath a floor of a track. It is understood that ferrous portion 912 together with such LSMs may form a linear synchronous motor propulsion system.

Illustrative Computer Architecture

Figure 10:
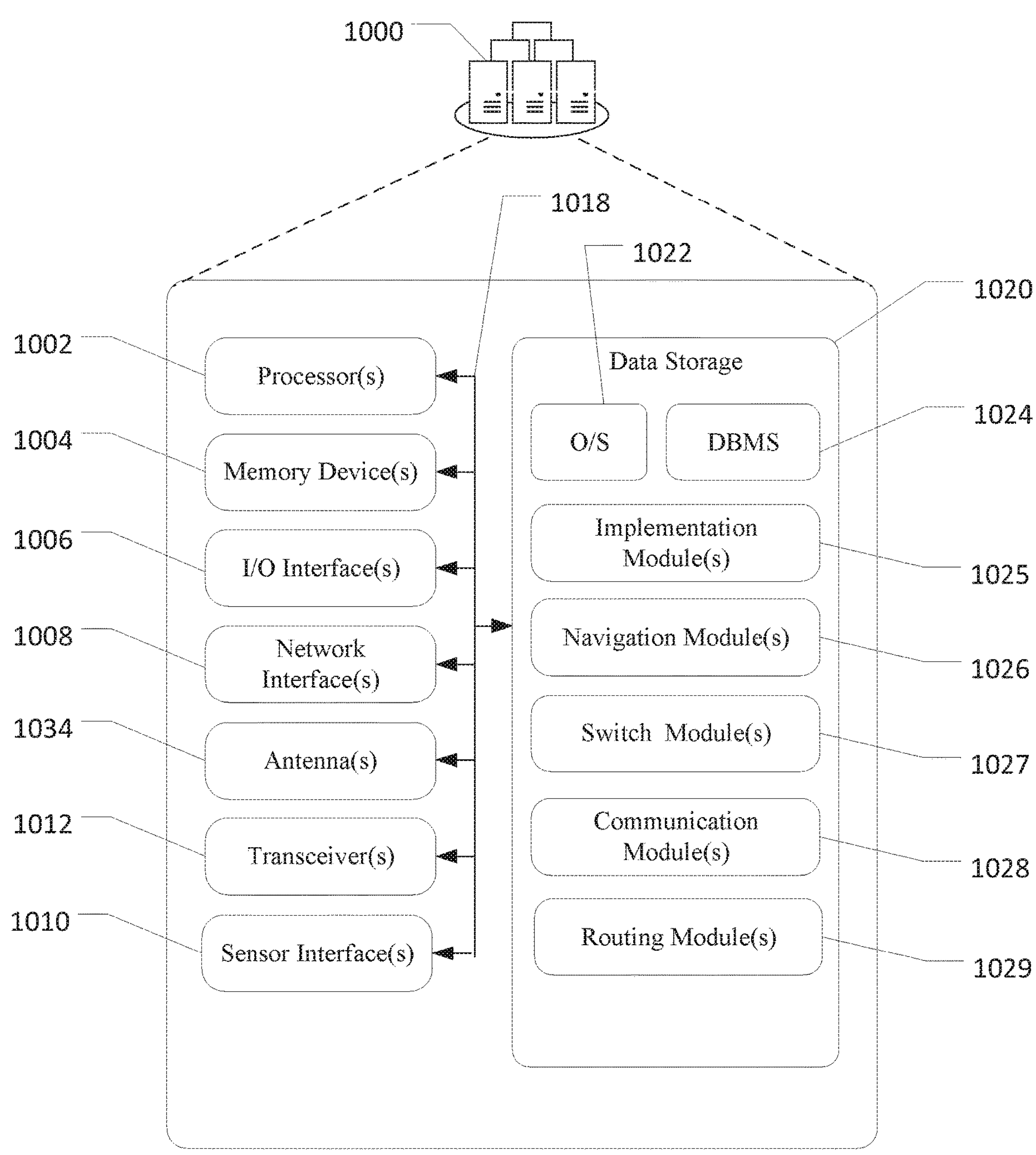
FIG. 10 schematically illustrates an example architecture of a server associated with a track system in accordance with one or more embodiments of the disclosure.

FIG. 10 is a schematic block diagram of an illustrative remote server 1000 of the track system with an electromagnet switch in accordance with one or more exemplary embodiments of the disclosure. The remote server 1000 may be any suitable computing device capable of receiving and/or sending data and/or controlling one or more electromagnets, and/or any other component of the track system. Remote server 1000 may optionally be coupled to and/or communicate with devices including, but not limited to, a controller, sensors, computing devices and/or one or more servers, or the like. Remote sensor 1000 may correspond to remote server 114 of FIG. 1, and/or any other servers of FIGS. 1-9. It is understood that remote server 1000 may instead be a controller or may the operations described herein may be performed by both remote server 1000 and a controller. The controller may be controller 112 of FIG. 1.

The remote server 1000 may be configured to communicate via one or more networks with one or more servers, computing devices, conveyors, controllers, or the like.

Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computing device 1000 may include one or more processors (processor(s)) 1002, one or more memory devices 1004 (generically referred to herein as memory 1004), one or more input/output (I/O) interface(s) 1006, one or more network interface(s) 1008, one or more optional sensors or sensor interface(s), one or more transceivers 1012, one or more optional speakers, one or more optional microphones, and one or more antenna(s) 1034. The computing device 1000 may further include one or more buses 1018 that functionally couple various components of the computing device 1000. The computing device 1000 may further include one or more antenna(e) 1034 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals including BLE signals, a Near Field Communication (NFC) antenna for transmitting or receiving NFC signals, a 900 MHz antenna, and so forth. These various components will be described in more detail hereinafter.

The bus(es) 1018 may include at least one of a system bus, a memory bus, an address bus, or a message bus, and may permit exchange of information (e.g., data (including computer-executable code), signaling, etc.) between various components of the computing device 1000. The bus(es) 1018 may include, without limitation, a memory bus or a memory controller, a peripheral bus, an accelerated graphics port, and so forth. The bus(es) 1018 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 1004 of the computing device may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 1004 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 1004 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 1020 may include removable storage and/or non-removable storage including, but not limited to, magnetic storage, optical disk storage, and/or tape storage. The data storage 1020 may provide non-volatile storage of computer-executable instructions and other data. The memory 1004 and the data storage 1020, removable and/or non-removable, are examples of computer-readable storage media (CRSM) as that term is used herein.

The data storage 1020 may store computer-executable code, instructions, or the like that may be loadable into the memory 1004 and executable by the processor(s) 1002 to cause the processor(s) 1002 to perform or initiate various operations. The data storage 1020 may additionally store data that may be copied to memory 1004 for use by the processor(s) 1002 during the execution of the computer-executable instructions. Moreover, output data generated as a result of execution of the computer-executable instructions by the processor(s) 1002 may be stored initially in memory 1004, and may ultimately be copied to data storage 1020 for non-volatile storage.

More specifically, the data storage 1020 may store one or more operating systems (O/S) 1022; one or more optional database management systems (DBMS) 1024; and one or more implementation module(s) 1025, one or more navigation module(s) 1026, one or more switch module(s) 1027, and/or one or more communication module(s) 1028. Some or all of these module(s) may be sub-module(s). Any of the components depicted as being stored in data storage 1020 may include any combination of software, firmware, and/or hardware. The software and/or firmware may include computer-executable code, instructions, or the like that may be loaded into the memory 1004 for execution by one or more of the processor(s) 1002. Any of the components depicted as being stored in data storage 1020 may support functionality described in reference to correspondingly named components earlier in this disclosure.

The data storage 1020 may further store various types of data utilized by components of the computing device 1000. Any data stored in the data storage 1020 may be loaded into the memory 1004 for use by the processor(s) 1002 in executing computer-executable code. In addition, any data depicted as being stored in the data storage 1020 may potentially be stored in one or more datastore(s) and may be accessed via the DBMS 1024 and loaded in the memory 1004 for use by the processor(s) 1002 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 10, the datastore(s) may include, for example, user preference information, user contact data, device pairing information, and other information.

The processor(s) 1002 may be configured to access the memory 1004 and execute computer-executable instructions loaded therein. For example, the processor(s) 1002 may be configured to execute computer-executable instructions of the various program module(s), applications, engines, or the like of the computing device 1000 to cause or facilitate various operations to be performed in accordance with one or more embodiments of the disclosure. The processor(s) 1002 may include any suitable processing unit capable of accepting data as input, processing the input data in accordance with stored computer-executable instructions, and generating output data. The processor(s) 1002 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), an application-specific integrated circuit, a digital signal processor (DSP), and so forth. Further, the processor(s) 1002 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 1002 may be capable of supporting any of a variety of instruction sets.

Referring now to functionality supported by the various program module(s) depicted in FIG. 10, the implementation module(s) 1025 may include computer-executable instructions, code, or the like that responsive to execution by one or more of the processor(s) 1002 may perform functions including, but not limited to, overseeing coordination and interaction between one or more modules and computer executable instructions in data storage 1020, determining user selected actions and tasks, determining actions associated with user interactions, determining actions associated with user input, sending and receiving signals and/or data to and from one or more sensors, switches, electromagnets, LSMs, controllers, other computing devices, servers, datastores and the like, initiating commands locally or at remote computing devices, and the like.

Navigation module 1026 may include computer-executable instructions, code, or the like that responsive to execution by one or more of the processor(s) 1002 may perform functions including, but not limited to determining a destination for a shuttle and/or a payload and determining to switch a shuttle from one path (e.g., a linear path) to a different path (e.g., curved path) along a track.

Switch module 1027 may include computer-executable instructions, code, or the like that responsive to execution by one or more of the processor(s) 1002 may perform functions including, but not limited to controlling one or more electromagnets and/or switches for causing a shuttle to advance along a track and for determining to activate an electromagnet at a switch to cause a shuttle be diverted or redirected to a different path on the track.

The communication module(s) 1028 may include computer-executable instructions, code, or the like that responsive to execution by one or more of the processor(s) 1002 may perform functions including, but not limited to, communicating with one or more sensors, controllers, conveyor belts, conveyor systems, for example, via wired or wireless communication, communicating with electronic devices, communicating with one or more computing devices, servers (e.g., remote servers), communicating with remote datastores and/or databases, sending or receiving notifications or commands/directives, communicating with cache memory data, and the like.

The routing module 1029 may include computer-executable instructions, code, or the like that responsive to execution by one or more of the processor(s) 1002 may perform functions including, but not limited to, determining an optimal or desirable routing path to a downstream stations and/or locations (e.g., packaging station, sortation station, etc.). Routing module 1029 may further determine updated routing information based on updated information regarding an order, malfunction, delivery route, or the like, relating to the package, item, order, user account, etc. In one example, routing module 1029 may be responsible for load balancing when slowdowns and/or backups are identified in the fulfillment and/or sortation centers.

Referring now to other illustrative components depicted as being stored in the data storage 1020, the O/S 1022 may be loaded from the data storage 1020 into the memory 1004 and may provide an interface between other application software executing on the computing device 1000 and hardware resources of the computing device 1000. More specifically, the O/S 1022 may include a set of computer-executable instructions for managing hardware resources of the computing device 1000 and for providing common services to other application programs (e.g., managing memory allocation among various application programs). In certain example embodiments, the O/S 1022 may control execution of the other program module(s) to for content rendering. The O/S 1022 may include any operating system now known or which may be developed in the future including, but not limited to, any server operating system, any mainframe operating system, or any other proprietary or non-proprietary operating system.

The optional DBMS 1024 may be loaded into the memory 1004 and may support functionality for accessing, retrieving, storing, and/or manipulating data stored in the memory 1004 and/or data stored in the data storage 1020. The DBMS 1024 may use any of a variety of database models (e.g., relational model, object model, etc.) and may support any of a variety of query languages. The DBMS 1024 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. As the computing device 1000 is a mobile electronic device, the DBMS 1024 may be any suitable light-weight DBMS optimized for performance on a mobile device.

Referring now to other illustrative components of the computing device 1000, the optional input/output (I/O) interface(s) 1006 may facilitate the receipt of input information by the computing device 1000 from one or more I/O devices as well as the output of information from the computing device 1000 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computing device 1000 or may be separate. The I/O devices may further include, for example, any number of peripheral devices such as data storage devices, printing devices, and so forth.

The I/O interface(s) 1006 may also include an interface for an external peripheral device connection such as universal serial bus (USB), Fire Wire, Thunderbolt, Ethernet port or other connection protocol that may connect to one or more networks. The I/O interface(s) 1006 may also include a connection to one or more of the antenna(e) 1034 to connect to one or more networks via a wireless local area network (WLAN) (such as Wi-Fi®) radio, Bluetooth, ZigBee, and/or a wireless network radio, such as a radio capable of communication with a wireless communication network such as a Long Term Evolution (LTE) network, WiMAX network, 3G network, ZigBee network, etc.

The computing device 1000 may further include one or more network interface(s) 1008 via which the computing device 1000 may communicate with any of a variety of other systems, platforms, networks, devices, and so forth. The network interface(s) 1008 may enable communication, for example, with one or more wireless routers, one or more host servers, one or more web servers, and the like via one or more of networks.

The antenna(e) 1034 may include any suitable type of antenna depending, for example, on the communications protocols used to transmit or receive signals via the antenna (e) 1034. Non-limiting examples of suitable antennas may include directional antennas, non-directional antennas, dipole antennas, folded dipole antennas, patch antennas, multiple-input multiple-output (MIMO) antennas, or the like. The antenna(e) 1034 may be communicatively coupled to one or more transceivers 1012 or radio components to which or from which signals may be transmitted or received.

As previously described, the antenna(e) 1034 may include a Bluetooth antenna configured to transmit or receive signals in accordance with established standards and protocols, such as Bluetooth and/or BLE. Alternatively, or in addition to, antenna(e) 1034 may include cellular antenna configured to transmit or receive signals in accordance with established standards and protocols, such as or cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like. The antenna(e) 1034 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 1034 may be configured to transmit or receive radio frequency signals within any suitable frequency range forming part of the unlicensed portion of the radio spectrum (e.g., 900 MHz).

The antenna(e) 1034 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 1012 may include any suitable radio component(s) for—in cooperation with the antenna(e) 1034—transmitting or receiving radio frequency (RF) signals in the bandwidth and/or channels corresponding to the communications protocols utilized by the computing device 1000 to communicate with other devices. The transceiver(s) 1012 may include hardware, software, and/or firmware for modulating, transmitting, or receiving—potentially in cooperation with any of antenna(e) 1034—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 1012 may further include hardware, firmware, or software for receiving GNSS signals. The transceiver(s) 1012 may include any known receiver and baseband suitable for communicating via the communications protocols utilized by the computing device 1000. The transceiver(s) 1012 may further include a low noise amplifier (LNA), additional signal amplifiers, an analog-to-digital (A/D) converter, one or more buffers, a digital baseband, or the like.

The optional sensor(s)/sensor interface(s) 1010 may include or may be capable of interfacing with any suitable type of sensing device such as, for example, inertial sensors (e.g., motion sensor(s)), force sensors, thermal sensors, and so forth. Example types of inertial sensors may include accelerometers (e.g., MEMS-based accelerometers), gyroscopes, and so forth. Sensor(s)/sensor interface(s) 1010 may additionally, or alternatively, include health related sensors such as electrocardiogram (ECG) sensors, glucose sensors, heartrate sensors, temperature sensors, and the like. The optional speaker(s) may be any device configured to generate audible sound. The optional microphone(s) may be any device configured to receive analog sound input or voice data, and may include noise cancellation functionality.

It should be appreciated that the program module(s), applications, computer-executable instructions, code, or the like depicted in FIG. 10 as being stored in the data storage 1020 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computing device 1000 and/or hosted on other computing device(s) accessible via one or more networks, may be provided to support functionality provided by the program module(s), applications, or computer-executable code depicted in FIG. 10 and/or additional or alternate functionality. Further, functionality may be modularized differently such that processing described as being supported collectively by the collection of program module(s) depicted in FIG. 10 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 10 may be implemented, at least partially, in hardware and/or firmware across any number of devices.

It should further be appreciated that the computing device 1000 may include alternate and/or additional hardware, software, or firmware components beyond those described or depicted without departing from the scope of the disclosure. More particularly, it should be appreciated that software, firmware, or hardware components depicted as forming part of the computing device 1000 are merely illustrative and that some components may not be present or additional components may be provided in various embodiments. While various illustrative program module(s) have been depicted and described as software module(s) stored in data storage 1020 it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more exemplary embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, “can,” “could,” “might,” or “may,” unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A system comprising:

a set of rails that form a track having a central axis, the set of rails comprising a first rail segment on a first side of the central axis and a second rail segment on a second side of the central axis, wherein the track comprises a linear path and a curved path that intersects the linear path;

a shuttle configured to transport items from a first location to a second location using the set of rails, the shuttle comprising:

a first ferrous block; and a set of wheels;

a set of linear synchronous motors (LSMs) disposed along the central axis;

a wall structure extending along the curved path;

a magnet assembly forming a side of the curved path, the magnet assembly comprising a set of focused magnets arranged in series along an exterior of the wall structure and coupled to the wall structure, each focused magnet of the set of focused magnets having a housing, a set of magnets arranged in series and alternating in polarity, and a backing structure positioned behind the set of magnets such that the set of magnets is between the backing structure and the wall structure, the set of magnets and the backing structure disposed in the housing, wherein the backing structure comprises a set of plates and each backing structure is secured to a respective housing via a respective set of magnets, and wherein each housing and each backing structure is curved and configured to conform to the wall structure; and an electromagnet disposed along a side of the curved path adjacent to the set of focused magnets and preceding the set of focused magnets along a direction of travel of the shuttle, the electromagnet configured to be selectively energized;

wherein the first ferrous block of the shuttle is attracted to the electromagnet and the set of focused magnets when the electromagnet is energized, causing the shuttle to divert from the linear path and enter the curved path when the electromagnet is energized.

2. The system of claim 1, wherein the shuttle comprises a second ferrous block and the set of LSMs is configured to propel the second ferrous block to cause the shuttle to advance along the central axis in the direction of travel.

3. The system of claim 1, wherein the wall structure is metallic and is configured guide the set of wheels of the shuttle as the shuttle traverses the curved path.

4. A system comprising:

a set of rails that form a track, the set of rails comprising a first rail segment on a first side and a second rail segment on a second side, the track comprising a linear path and a curved path that intersects the linear path, the set of rails configured to guide a shuttle with a payload;

a wall structure that is curved;

a magnet assembly comprising a set of focused magnets arranged in series along an exterior of the wall structure and coupled to the wall structure, each focused magnet of the set of focused magnets having a housing, a set of magnets arranged in series alternating in polarity, and a backing structure positioned such that the set of magnets is between the backing structure and the wall structure, the set of magnets and the backing structure disposed in the housing, wherein the backing structure comprises a set of plates and each backing structure is secured to a respective housing via a respective set of magnets, and wherein each housing and each backing structure is curved and configured to conform to the wall structure; and an electromagnet disposed along a side of the curved path adjacent to the magnet assembly and preceding the set of focused magnets along a direction of travel of the shuttle, the electromagnet configured to be selectively energized;

wherein a ferrous portion of the shuttle is attracted to the electromagnet and the set of focused magnets when the electromagnet is energized, causing the shuttle to enter the curved path.

5. The system of claim 4, further comprising a set of linear synchronous motors (LSMs) disposed along a central axis of the set of rails and configured to cause the shuttle to advance along the set of rails.

6. The system of claim 5, further comprising the shuttle configured to transport the payload from a first location to a second location using the set of rails, the shuttle comprising an onboard first ferrous portion configured to interface with the electromagnet and the set of focused magnets, an onboard second ferrous portion configured to interface with the set of LSMs, and a set of wheels configured to interface with the wall structure.

7. The system of claim 4, wherein for each focused magnet of the set of focused magnets, a respective set of magnets, a respective backing member, and a respective housing are coupled via a first threaded engagement and the respective housing and the wall structure are coupled via a second threaded engagement.

8. The system of claim 4, wherein one or more of the wall structure and backing member is stainless steel.

9. The system of claim 4, wherein each housing of the magnetic assembly is made from glass reinforced nylon and comprises a first set of through holes configured to receive a first set of bolts to couple the housing to the wall structure and a second set of through holes configured to receive a second set of bolts to couple the housing to a respective set of magnets and a respective backing member.

10. A method comprising:

causing a shuttle having a payload and comprising a ferrous portion to advance along a set of rails that form a track, the set of rails comprising a first rail segment on a first side and a second rail segment on a second side, the track comprising a linear path and a curved path that intersects the linear path at an intersection;

determining to divert the shuttle from the linear path to the curved path at a switching area of the track positioned at the intersection, the curved path comprising a wall structure that is curved forming a side of the curved path, a magnet assembly comprising a set of focused magnets arranged in series along an exterior of the wall structure and coupled to the wall structure, and an electromagnet adjacent to the magnet assembly and preceding the magnet assembly along a direction of travel of the shuttle; and causing the electromagnet to energize to divert the shuttle from the linear path to the curved path by attracting the ferrous portion in the shuttle, wherein each focused magnet of the set of focused magnets has a housing, a set of magnets arranged in series alternating in polarity, and a backing structure positioned such that the set of magnets is between the backing structure and the wall structure, wherein the backing structure comprises a set of plates and each backing structure is secured to a respective housing via a respective set of magnets, and wherein each housing and each backing structure is curved and configured to conform to the wall structure.

11. The method of claim 10, wherein a set of linear synchronous motors (LSMs) is disposed along a central axis of the set of rails and adapted to propel a second ferrous portion of the shuttle.

12. The method of claim 11, further comprising, before causing the electromagnet to energize to divert the shuttle from the linear path to the curved, selectively causing the set of LSMs to energize to cause the shuttle advance along the linear path.

13. The method of claim 10, further comprising determining a destination corresponding to the payload and determining to divert the shuttle from the linear path to the curved path based on the destination.

14. The method of claim 10, wherein for each focused magnet of the set of focused magnets, a respective set of magnets, respective backing member, and respective housing are coupled via a first threaded engagement and the respective housing and the wall structure are coupled via a second threaded engagement.

15. The method of claim 10, wherein one or more of the wall structure and backing member is stainless steel.

* * * * *